३,179,647
POLYMERISATION CATALYSTS CONSISTING OF AN ALUMINUM ALKYL AND A RARE EARTH METAL CHLORIDE OR OXIDE
Richard Derek Mulley, Barnet, and Percy Arthur Small, Welwyn Garden City, England, assignors to Imperial Chemical Industries Limited, London, England, a corporation of Great Britain
No Drawing. Filed Jan. 16, 1958, Ser. No. 709,182
Claims priority, application Great Britain, Feb. 7, 1957, 4,229/57
13 Claims. (Cl. 260—94.9)

This invention relates to catalysts useful for polymerising ethylene.

According to the present invention catalysts useful for polymerising ethylene may be prepared by treating at least one rare earth metal compound with at least one compound selected from the class comprising hydrides, alkyl hydrides, alkyls, cycloalkyls, aryls and aralkyls of aluminum, and complexes of such compounds. It is believed that the catalysts produced as a result of the process of our invention are produced as a result of chemical reaction between components treated with one another. By rare earth metals we mean elements of atomic numbers 57 to 71 inclusive.

We prefer anhydrous rare earth metal oxides and halides, particularly the chlorides, as the rare earth metal compounds for use in the process of this invention because they are easily converted to useful catalysts. Lanthanum and cerium are very effective rare earth metals for use in this invention. Mixtures of rare earth metal compounds may be used.

We prefer in the process of this invention to react a rare earth metal compound with one of the said alkyl compounds because of the high reactivity of these compounds. Our preferred alkyl compounds are the trialkyls of aluminum because they can be prepared without difficulty and relatively small molar amounts of them are required to prepare particular catalysts. We particularly prefer to use aluminum trialkyls of low carbon content, e.g. those having not more than four carbons in each alkyl radical because of the ease with which these can be handled in solution or, in the case of the trimethyl and triethyl, as vapour. The lower alkyls are also less costly to prepare than the higher alkyls.

We find that when the catalysts of this invention are used for the polymerisation of ethylene at about 70° C., the molecular ratio in which the two catalyst forming ingredients may be treated with one another may be varied quite widely, e.g. from 10:1 to 1:10, as indicated by the examples set out below, without a marked change resulting in the melt index of the polyethylene produced. However, we find that maximum yields of polyethylene are obtained from our catalysts when the catalyst forming ingredients are treated with one another in equimolecular or approximately equimolecular quantities. The molecular weight of the polymer formed can be controlled by such reagents as hydrogen or by control of the temperature of polymerisation.

The process of this invention is most easily conducted in the presence of a hydrocarbon solvent. Such a solvent is preferably one which is free from sulphur impurities as the catalyst is preferably used as a polymerisation catalyst in the presence of the solvent in which it is produced and best polymerisation yields are obtained with solvents free from sulphur impurities which are believed to have a poisoning effect on our catalysts.

Many rare earth metal compounds are insoluble in hydrocarbon solvents (including liquid hydrocarbon monomers). These may be treated with the other catalyst forming compound by milling them, e.g. ball milling them, with, preferably, a solution of the other catalyst forming compound in a hydrocarbon solvent.

As the compounds for reaction with rare earth metal compounds in the process of this invention and the catalysts produced are decomposed by oxygen or humidity, the process of this invention and polymerisations using the catalysts produced should be conducted in the absence of air or moisture or in the presence of only limited amounts of them.

It is desirable to conduct the ethylene polymerisation of our invention at a superatmospheric pressure as the process is, as a result, accelerated. The use of pressure is, however, not essential to this process and relatively low pressures, e.g. 70 atmospheres, have a useful accelerating effect.

In view of the reactive nature of the catalysts of our invention it is desirable to remove these catalysts from polymeric materials produced with them. The catalysts may be decomposed by treating polymeric materials containing them with an hydroxyl containing compound, e.g. water or steam, or an alcohol, including a dry alcohol, e.g. methanol or butanol. The decomposition products may then be removed by washing the polymeric materials with for example, methanol, an acid or alkaline medium as is appropriate.

The following examples serve to illustrate this invention. It will, however, be appreciated that this invention is in no way limited by these examples.

EXAMPLE 1

0.018 mol of aluminum triethyl were dissolved in 40 mls. of petroleum ether (B.P. 60°–80° C.). This solution was ball milled with 0.012 mol lanthanum trichloride for 18 hours in a ball mill from which all oxygen and moisture had been removed by sweeping with oxygen-free nitrogen. The fine slurry obtained was diluted with a further 100 mls. petroleum ether and stirred for 4½ hours at 20°–30° C. while a slow stream of ethylene was passed over it. The solid reaction product was shredded and extracted, first with methanol, then with ethanolic hydrochloric acid and finally with methanol again. After drying in vacuo at 60° C. for 18 hours 200 mgm. solid polymer of ethylene were obtained.

EXAMPLE 2

0.025 mol of aluminum triethyl were dissolved in 40 mls. of petroleum ether (B.P. >150° C.). This solution was ball milled with 0.016 mol lanthanum trichloride for 16½ hours in an atmosphere free from oxygen and moisture. A further 250 mls. petroleum ether (B.P. >150° C.) were added to the slurry obtained, which was then transferred to a 1,400 ml. capacity autoclave which was free from oxygen and moisture, and ethylene was supplied to raise the autoclave pressure to 50 ats. at 20° C. The autoclave was held at 70° C. for 17 hours (the maximum pressure was 82 ats.). After washing and drying as described in Example 1, 28 gms. of solid polymer of ethylene were obtained.

EXAMPLE 3

Petroleum ether having a boiling point of 120° C. was purified by refluxing overnight with anhydrous aluminum chloride, distilling, refluxing overnight with sodium potassium alloy and distilling again, these operations being conducted in an atmosphere of nitrogen. The purified petroleum ether obtained was stored over sodium potassium alloy and under an atmosphere of nitrogen. 0.09 mol of aluminum triethyl dissolved in 70 mls. methyl cyclohexane were mixed with 50 mls. of the purified petroleum ether and ball-milled in a dry, oxygen-free ball mill with 0.06 mol ceric oxide for 21 hours. The suspension was transferred to a 1,400 ml. capacity autoclave which was fitted with a stirrer and which had been freed from oxygen by sweeping with dry nitrogen. A further 170 mls. of the purified petroleum ether were added. Ethylene was supplied to the autoclave to raise the pressure to 50 ats. at 22° C. and the autoclave was stirred and heated to 70° C. for 17 hours, the pressure rising initially to 82 ats. After washing and drying as described in Example 1, 103 gms. of solid polymer of ethylene were obtained.

EXAMPLES 4–12

Catalysts of this invention were prepared at room temperature, in an atmosphere purged with nitrogen to remove oxygen and humidity, by ball milling for 18 hours a rare earth compound with a solution of an aluminum compound in a solvent, all as specified in the following table. Each slurry obtained was transferred to a 200 ml. stirred autoclave (still in the absence of oxygen and humidity) and ethylene was introduced so that, after the temperature of the autoclave had been adjusted, the maximum ethylene pressure was as shown in the table. After the polymerisation time stated, each batch of polyethylene produced was purified by treatment with methanol and ethanolic hydrochloric acid. Yields, crystalline melting points and melt viscosities of the polymers obtained were as shown in the table. Crystalline melting points were determined using a polarising microscope and melt viscosities were determined at 197° C. with a melt penetrometer using a 1 mm. diameter plunger loaded with 125 grams moving concentrically in a 2.5 mm. diameter tube.

After heating at 70° C. for 17 hours, 21.2 g. solid polyethylene, purified as in Examples 4–12, of crystal melting point 130–136° C. and melt viscosity at 197° C. of $1.2 \times 10^8$ poises, were obtained.

EXAMPLE 15

When gadolinium chloride (0.005 M) and aluminum triethyl (0.0075 M) were subjected to the same conditions as those described in Example 14, 3.4 g. solid polyethylene of crystal melting point 129–135° C. and melt viscosity at 197° C. of $6.5 \times 10^7$ poises, were obtained.

EXAMPLE 16

Similarly a mixture of neodymium and praseodymium trichlorides (1.35 g.) and aluminum triethyl (0.0075 M) gave 4.2 g. solid polyethylene (crystal melting point 132–136° C. and melt viscosity at 197° C. of $2.2 \times 10^7$ poises) under the same conditions as for Example 14.

EXAMPLE 17

A mixture of 50% Ce, 20% La, 20% Nd, 6% Pr trichlorides (1.28 g.) and aluminum triethyl (0.0075 M) under the conditions mentioned for Example 14 gave 2.0 g. solid polyethylene of crystal melting point 127–134° C. and melt viscosity at 197° C. of $4.2 \times 10^7$ poises.

We claim:

1. A process for the production of a catalyst useful for polymerising ethylene which comprises treating at least one lanthanum compound selected from the group consisting of the oxide and chloride of lanthanum, with an aluminum alkyl.

Table

| Example | Rare earth Compound | Moles | Aluminum Compound | Moles | Solvent | Ml. | Maximum Ethylene pressure, ats. | Polymerisation Temp., °C. | Time, hrs. | Polyethylene Yield, g. | Crystalline melting point, °C. | Melt viscosity @ 197°C., poises |
|---|---|---|---|---|---|---|---|---|---|---|---|---|
| 4 | CeO₂ | 0.005 | Aluminum triisobutyl | 0.05 | Petroleum ether (B.P. >120° C.) | 95 | 55 | 70 | 18 | 9.5 | 118–134 | $3.0 \times 10^8$ |
| 5 | CeO₂ | 0.013 | ...do... | 0.027 | ...do... | 95 | 55 | 70 | 18 | 9.6 | 120–132 | $5.0 \times 10^8$ |
| 6 | CeO₂ | 0.02 | ...do... | 0.02 | ...do... | 95 | 55 | 70 | 18 | 17.2 | | $5.3 \times 10^8$ |
| 7 | CeO₂ | 0.024 | ...do... | 0.016 | ...do... | 95 | 55 | 70 | 18 | 14.3 | 122–134 | $4.3 \times 10^8$ |
| 8 | CeO₂ | 0.027 | ...do... | 0.013 | ...do... | 95 | 55 | 70 | 18 | 5.7 | 125–135 | $4.05 \times 10^8$ |
| 9 | CeO₂ | 0.05 | ...do... | 0.005 | ...do... | 95 | 55 | 70 | 18 | 0.29 | 124–132 | $4.05 \times 10^8$ |
| 10 | CeO₂ | 0.02 | ...do... | 0.02 | Methyl cyclohexane | 100 | 40 | 25 | 18 | 10.8 | 121–133 | $3.15 \times 10^9$ |
| 11 | Samarium trichloride | 0.005 | LiAlH₄ | 0.01 | Toluene | 100 | 60 | 70 | 13 | 11.6 | 124–134 | $7.05 \times 10^7$ |
| 12 | CeCl₃ | 0.005 | AlEt₃ | 0.0075 | Petroleum ether (B.P. >120° C.) | 50 | 78 | 60–70 | 17 | 2.0 | 127–134 | $1.8 \times 10^7$ |

EXAMPLE 13

AlEt₃ (0.09 M) in methyl cyclohexane (70 mls.) was mixed with petroleum ether (50 mls., B.P. >120° C.) and ball-milled with ceric oxide (0.09 M) for 21 hours. This suspension was transferred to an autoclave (1,400 ml. capacity) with more petroleum ether (170 mls.) and ethylene added to raise the pressure to 52 atmospheres at 22° C. The stirred autoclave was heated at 130° C. for 16 hours (maximum pressure=94 ats.). The polymer was purified as described for Examples 4–12 and 54 g. of solid polyethylene obtained in a coherent block (crystal melting point 127–128° C.; melt viscosity at 197° C.=$5.1 \times 10^5$ poises) and, loosely adhering to it, 185 g. of grease-like material were obtained.

EXAMPLE 14

Samarium chloride (0.005 M), aluminum triethyl (0.0075 M) were ball-milled together in petroleum ether (50 mls., B.P. >120° C.) for 16 hours at room temperature. The suspension was transferred to a 200 ml. capacity autoclave with more petroleum ether (50 mls.) and the pressure raised to 50 atmospheres with ethylene.

2. A process for polymerising ethylene which comprises contacting the ethylene with a catalyst obtained by treating at least one lanthanum compound selected from the group consisting of the oxide and chloride of lanthanum, with an aluminum alkyl.

3. A catalyst useful for polymerising ethylene obtained by treating at least one lanthanum compound selected from the group consisting of the oxide and chloride of lanthanum, with an aluminum alkyl.

4. The process of polymerising ethylene that comprises subjecting ethylene in a liquid hydrocarbon reaction medium to the action of a catalyst consisting essentially of an aluminum trialkyl wherein the alkyl groups contain 1–4 carbon atoms and lanthanum trichloride.

5. The process of claim 4 wherein said aluminum alkyl is aluminum triethyl and said hydrocarbon solvent is petroleum ether.

6. A process according to claim 1 in which said aluminum alkyl is a trialkyl.

7. A process according to claim 6 in which each alkyl radical of said aluminum compound has less than five carbon atoms.

8. A process according to claim 1 in which the lanthanum compound is treated with said aluminum alkyl in a substantially equimolecular ratio.

9. A process according to claim 1 conducted in a hydrocarbon solvent.

10. A process according to claim 9 in which said solvent is free from sulphur impurities.

11. A process according to claim 9 in which said lanthanum compound is milled with a solution of said aluminum alkyl in a hydrocarbon solvent.

12. A process according to claim 2 in which said catalyst is used mixed with a hydrocarbon solvent.

13. A process according to claim 2 conducted under a superatmospheric pressure of ethylene.

References Cited by the Examiner

UNITED STATES PATENTS

| | | | |
|---|---|---|---|
| 2,030,283 | 2/36 | De Rewal | 252—462 |
| 2,410,558 | 11/46 | Webb et al. | 252—462 |
| 2,907,757 | 10/59 | Merckling | 260—94.9 |
| 2,921,060 | 1/60 | Stuart | 260—94.9 |

FOREIGN PATENTS

| | | |
|---|---|---|
| 533,362 | 5/55 | Belgium. |
| 538,782 | 12/55 | Belgium. |
| 1,135,808 | 12/56 | France. |
| 1,136,818 | 1/57 | France. |

OTHER REFERENCES

Lange: "Handbook of Chemistry," sixth edition, p. 85 (1946).

JOSEPH L. SCHOFER, *Primary Examiner*.

B. E. LANHAM, M. LIEBMAN, L. H. GASTON, WILLIAM H. SHORT, *Examiners*.